US010992006B2

(12) United States Patent
Cai et al.

(10) Patent No.: US 10,992,006 B2
(45) Date of Patent: Apr. 27, 2021

(54) OUTPUT ELECTRODE BASE, BATTERY MODULE AND BATTERY PACK

(71) Applicant: CONTEMPORARY AMPEREX TECHNOLOGY CO., LIMITED, Ningde (CN)

(72) Inventors: Shengtian Cai, Ningde (CN); Chuanlian Chen, Ningde (CN); Yangzhi Huang, Ningde (CN); Jihua Yao, Ningde (CN); Daohui Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 16/542,388

(22) Filed: Aug. 16, 2019

(65) Prior Publication Data
US 2020/0152928 A1 May 14, 2020

(30) Foreign Application Priority Data

Nov. 13, 2018 (CN) .......................... 201821864791.2

(51) Int. Cl.
*H01M 4/02* (2006.01)
*H01M 50/172* (2021.01)
*H01M 50/20* (2021.01)
*H01M 50/543* (2021.01)

(52) U.S. Cl.
CPC ......... *H01M 50/172* (2021.01); *H01M 50/20* (2021.01); *H01M 50/543* (2021.01)

(58) Field of Classification Search
CPC ....................................................... H01M 4/02
See application file for complete search history.

(56) References Cited

U.S. PATENT DOCUMENTS

| 2017/0025865 A1* | 1/2017 | Imazaki | .............. H01M 10/399 |
| 2018/0138466 A1 | 5/2018 | Fees et al. | |
| 2018/0145302 A1* | 5/2018 | Okazaki | ................ H01M 10/48 |

FOREIGN PATENT DOCUMENTS

WO 2009128220 A1 10/2009

OTHER PUBLICATIONS

Extended European Search Report for European Patent Application No. 19191941.4 dated Apr. 24, 2020.

\* cited by examiner

*Primary Examiner* — Jacob B Marks
(74) *Attorney, Agent, or Firm* — Heslin Rothenberg Farley & Mesiti P.C.

(57) ABSTRACT

Embodiments of the present disclosure provide a battery pack, a battery module and an output electrode base. The output electrode base includes a base body and a connector, and the connector is a metal structure; the connector includes a securing member and a connecting post, the securing member is secured in the base body, and the connecting post protrudes from the base body; an output electrode connection piece of the battery module is provided with a first installing hole, and the connecting post passes through the first installing hole to be connected with the output electrode connection piece.

20 Claims, 6 Drawing Sheets

OUTPUT ELECTRODE BASE, BATTERY MODULE AND BATTERY PACK

CROSS-REFERENCE TO RELATED APPLICATION

This application claims the priority benefit of Chinese Utility Model Application No. 201821864791.2 filed on Nov. 13, 2018 and entitled "OUTPUT ELECTRODE BASE, BATTERY MODULE AND BATTERY PACK", the disclosure of which is incorporated by reference herein in its entirety.

TECHNICAL FIELD

The present disclosure relates to the field of energy storage device technology, especially to an output electrode base, a battery module and a battery pack.

BACKGROUND

In a battery module, an output electrode base is installed at an end plate of an output end of the battery module, and is configured to connect an output electrode connection piece and provide insulation protection for the output electrode connection piece.

SUMMARY

Some embodiments of the present disclosure provides an output electrode base of a battery module, wherein the output electrode base includes a base body and a connector, and the connector is a metal structure;

the connector includes a securing member and a connecting post, the securing member is secured in the base body, and the connecting post protrudes from the base body; and the connecting post is configured to penetrate through a first installing hole of an output electrode connection piece of the battery module and connect with the output electrode connection piece.

In some embodiments, the connector further includes a metal plate above the base body, and the metal plate is configured to abut against the output electrode connection piece; the connecting post of the connector is a metal structure.

In some embodiments, the securing member includes a first securing member and a second securing member;

the first securing member and the second securing member are disposed axially relative to the connecting post, the second securing member is configured to contact with the base body radially and axially, and a radial size of the second securing member is greater than a radial size of the first securing member.

In some embodiments, the securing member further includes a third securing member, and the third securing member is disposed axially with the first securing member and second securing member relative to the connecting post; the third securing member is configured to penetrate through the base body to fixedly connect the metal plate.

In some embodiments, the output electrode base is provided with at least two connectors.

In some embodiments, the one end of the connecting post extends into the base body; and a portion of the connecting post located in the base body is connected with the securing member.

In some embodiments, the connector includes a flange bolt and a washer-nut, and the washer-nut is screwed to a threaded rod of the flange bolt; and a head of the flange bolt, a flange of the flange bolt and the washer-nut form the securing member, and a portion of the threaded rod of the flange bolt forms the connecting post.

Besides, embodiments of the present disclosure further provides a battery module, including:

an end plate located at an output end of the battery module;

an output electrode connection piece provided with a first installing hole; and an output electrode base secured to the end plate and being the output electrode base as described-above.

Besides, embodiments of the present disclosure further provides a battery pack, including a casing and a plurality of battery modules;

each battery module is the battery module as described above;

the battery modules are connected through a module connection piece; and the module connection piece is provided with a second installing hole, and the connecting post is configured to connect the module connection piece with the output electrode connection piece through the second installing hole.

In some embodiments, the connecting post includes a threaded rod, and the connecting post is configured to screw with a nut; and the nut is configured to abut against the module connection piece.

In the present disclosure, after the connector is fixedly connected with the base body through the securing member, there is a connecting post protruding from the surface of the base body. Besides, the output electrode connection piece is correspondingly provided with a first installing hole. When the output electrode connection piece is to be connected with the base body, it is only necessary to insert the connecting post into the first installing hole, which may reduce accuracy requirement of the connection between the output electrode connection piece and the base body, thereby reducing difficulty in connection. Besides, because the connecting post is located outside the base body, when the output electrode connection piece is connected to the connecting post, another fastening member may be added to further fasten the output electrode connection piece and the base body, thereby improving connection reliability therebetween.

BRIEF DESCRIPTION OF THE DRAWINGS

In order to describe technical solutions of the embodiments of the present disclosure more clearly, the drawings used in the embodiments will be described briefly. It is evident that the following described drawings are only some embodiments of the present disclosure. For those skilled in the art, other drawings may be obtained based on these figures without any inventive effort.

REFERENCE SIGNS

Figure 1:
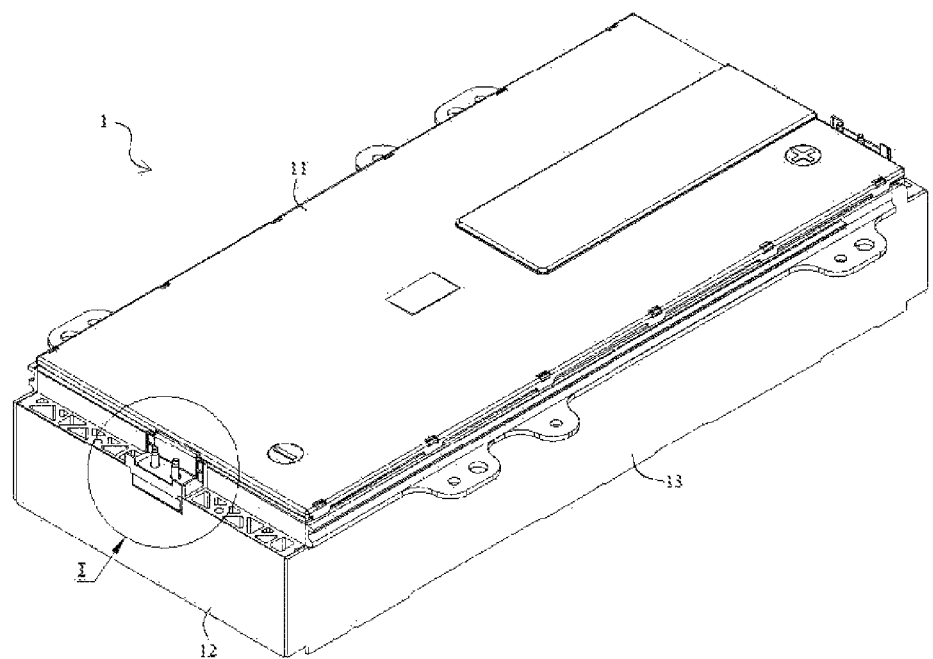
FIG. 1 is a schematic structural view of an embodiment of a battery module provided in the present disclosure.

1—battery module;
  11—top cover;
  12—end plate;
  13—side plate;
  14—output electrode connection piece;
  15—first installing hole;
2—output electrode base
  21—base body
    211—installation board
    212—installation base
  22—connector;
    221—connecting post;
    222—securing member;
      222a—first securing member;
      222b—second securing member;
      222c—third securing member
    223—metal plate
  23—nut
    231—second spacer
3—module connection piece
  31—second installing hole
4—casing

DETAILED DESCRIPTION

For a better understanding of the technical solutions of the present disclosure, embodiments of the present disclosure are described in detail below with reference to the accompanying drawings.

It shall be noted that embodiments described herein are only some, rather than all embodiments of the present disclosure. Based on the embodiments of the present disclosure, all other embodiments obtained by those skilled in the art without any inventive efforts fall into the scope of protection by the present disclosure.

The terms used in the embodiments of the present disclosure are merely for the purpose of describing specific embodiments, and are not intended to limit the present disclosure. The word "a", "the" or "said" which represents a singular form and which is used in the embodiments and the claims of the present disclosure intends further to represent a plural form, unless other meanings are clearly presented in the context.

It shall be understood that the term "and/or" as used herein only describes a correlative relationship between objects and represents three types of relationships. For example, A and/or B may indicate three cases: only A exists, both A and B exist, or only B exists. In addition, the sign "/" herein generally indicates that the objects before and after "/" are in an "or" relationship.

It shall be noted that directional terms such as "above", "below", "left" and "right" in the embodiments of the present disclosure are described with reference to the accompanying drawings, but shall not be understood as defining the embodiments of the present disclosure. Besides, in the context of the present disclosure, it shall also be noted that when it is described that an element is "above" or "under" another element, the former element may either be directly "above" or "under" the other element, or the former element may be "above" or "under" the other element with an intermediate element therebetween.

The inventors found during the invention process that, a base body of an output electrode base is connected with an output electrode connection piece through a single nut. The nut is installed in the base body, and the output electrode connection piece is provided with a bolt hole. When the base body is to be connected with the output electrode connection piece, a bolt passes through the bolt hole to connect with the nut in the base body.

When the output electrode base is connected with the output electrode connection piece, the bolt hole of the output electrode connection piece shall be aligned with the nut, and then the output electrode connection piece and the nut may be connected through the bolt. High operation accuracy is required on the connecting process, and it is not easy to realize the connection.

In view of this, some embodiments of the present disclosure provide an output electrode base, a battery module and a battery pack, to solve the problem that it is not easy to realize connection between an output electrode connection piece and a base body in the existing technology.

Figure 2:
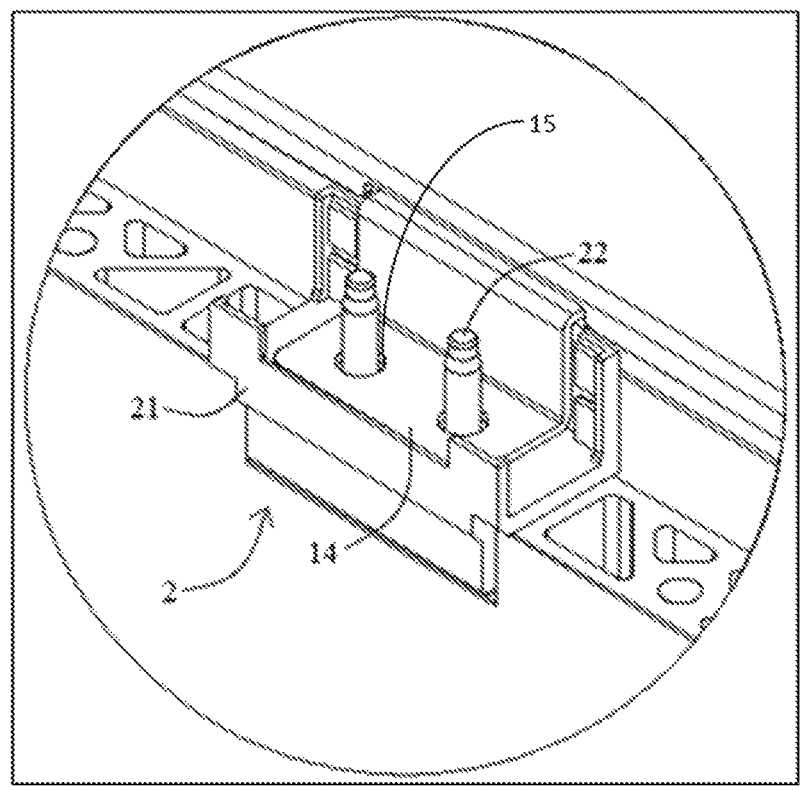
FIG. 2 is a partial zoomed-in view of Part I in FIG. 1.
Figure 3:
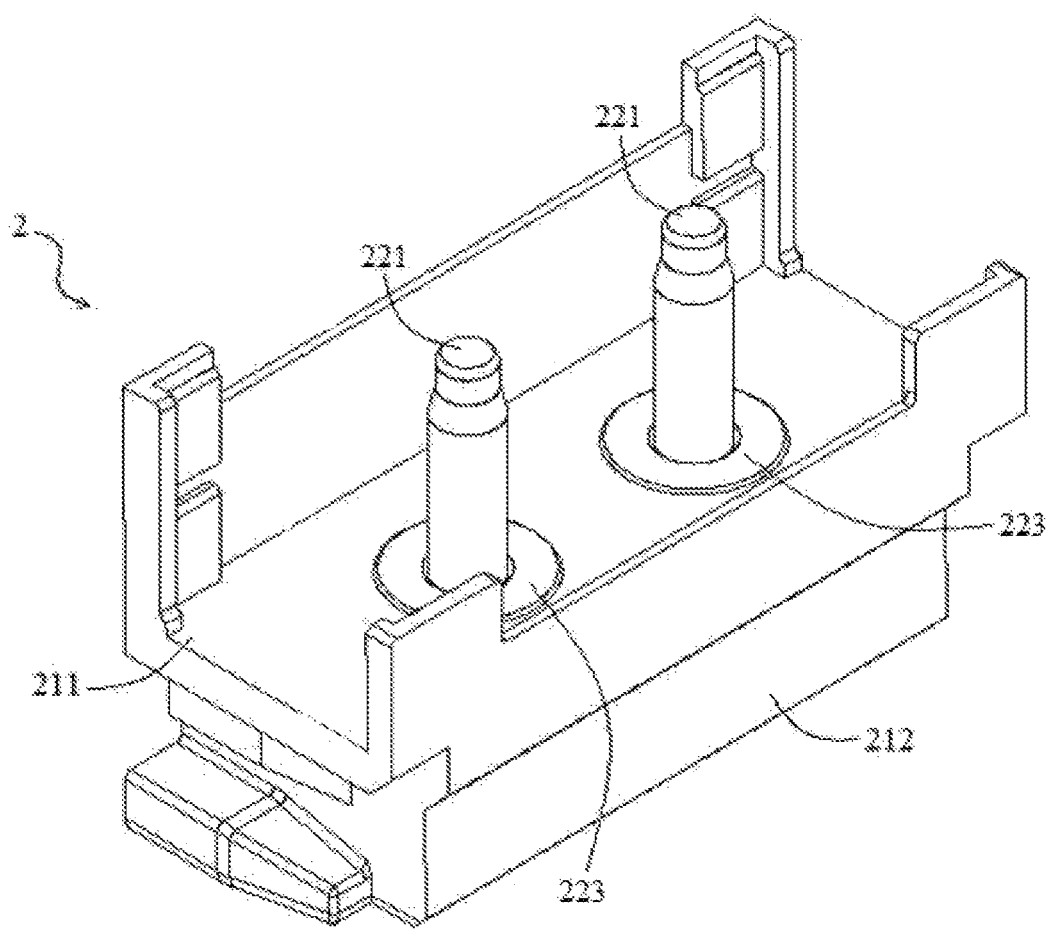
FIG. 3 is a schematic structural view of an output electrode base in FIG. 1.
Figure 4:
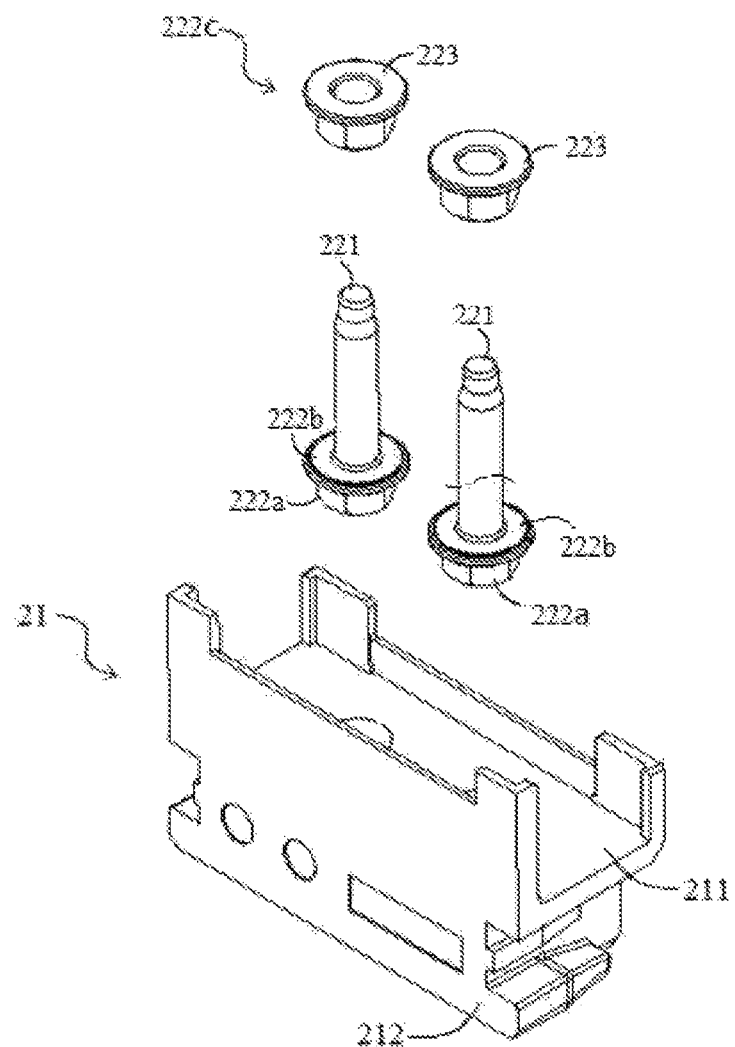
FIG. 4 is an explosive view of FIG. 3.
Figure 5:
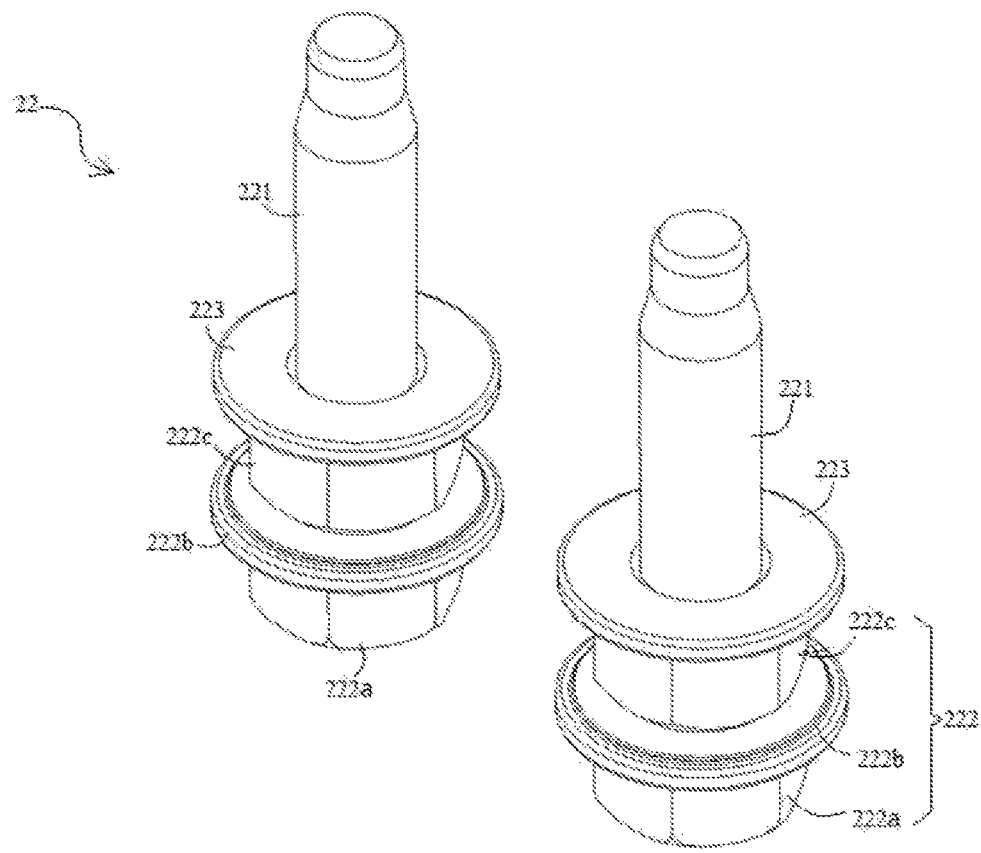
FIG. 5 is a schematic structural view of a connector in FIG. 3.

With reference to FIGS. 1-5, FIG. 1 is a schematic structural view of an embodiment of a battery module of the present disclosure; FIG. 2 is a partial zoomed-in view of Part I in FIG. 1; FIG. 3 is a schematic structural view of an output electrode base; FIG. 4 is an explosive view of FIG. 3; and FIG. 5 is a schematic structural view of a connector in FIG. 3.

In one specific embodiment, the present disclosure provides an output electrode base 2 of a battery module 1. As shown in FIG. 1 and FIG. 2, the battery module 1 includes a housing and a cell (not shown in the drawings) located in the housing. The housing includes a top cover 11, an end plate 12 and a side plate 13. The end plate 12 is located at an output electrode end of the battery module 1 and is configured to resist a swelling force of the cell. Besides, as shown in FIG. 2, the battery module 1 further includes an output electrode base 2 configured to provide insulation protection for an output electrode connection piece 14 of the battery module 1.

Specifically, as shown in FIG. 2 and FIG. 3, the output electrode base 2 includes a base body 21 and a connector 22. Herein, the connector 22 is secured to the base body 21 and may be fixedly connected with the output electrode connection piece 14 of the battery module 1. Therefore, the connector 22 may secure the output electrode connection piece 14 to the base body 21 to connect and fasten the output electrode connection piece 14. Besides, the base body 21 is an injection-molded plastic structure or a plastic structure, that is, an injection-molded member, and thus may provide insulation protection for the output electrode connection piece 14. In an example, the connector 22 is a metal structure, and in this case, the connection piece 14 has relative good strength property during connection. The base body 21 is made of plastic, the connector 22 is made of metal, the connector 22 is embedded in the base body 21 by injection molding process.

More specifically, as shown in FIG. 3 and FIG. 5, in the present disclosure, the connector 22 between the base body 21 and the output electrode connection piece 14 may include a connecting post 221 and a securing member 222. Herein, the connecting post 221 protrudes from the base body 21. In an example, the securing member 222 may be injection-molded in the base body 21, thereby realizing fixed connection between the connector 22 and the base body 21. Besides, the output electrode connection piece 14 is provided with a first installing hole adaptive to the connecting post 221. Upon connection, connecting posts 221 secured to the base body 21 may be inserted into corresponding first installing holes, thereby realizing fixed connection between the base body 21 and the output electrode connection piece 14.

In the present disclosure, after the connector 22 is fixedly connected with the base body 21, there is a connecting post 221 protruding from the surface of the base body 21. Besides, the output electrode connection piece 14 is correspondingly provided with a first installing hole. When the output electrode connection piece 14 is to be connected with the base body 21, it is only necessary to insert the connecting post 221 into the first installing hole, which may reduce accuracy requirement of the connecting operation between the output electrode connection piece 14 and the base body 21, thereby reducing connection difficulty therebetween. Besides, because the connecting post 221 is located outside the base body 21, when the output electrode connection piece 14 is connected to the connecting post 221, another fastening member may be added to further fasten the output electrode connection piece 14 and the base body 21, thereby improving connection reliability therebetween.

Further, fixed connection between the output electrode connection piece 14 and the base body 21 is realized through a plurality of connectors 22 that coordinate with each other, thereby improving connection reliability between the output electrode connection piece 14 and the base body 21. Besides, by the connection through the plurality of connectors 22 of metal structure, contact area between the output electrode connection piece 14 and the connecting posts 221 is large. That is, the area for current flow between the two is large, so that flow conveyance capacity of the connecting posts 221 is increased and heat generated during operation of the battery module 1 is reduced.

In the embodiments shown in FIGS. 1-5, the output electrode base includes two connectors 22 symmetrical to each other relative to the center of the base body 21. When the two connectors 22 are disposed, not only the connection between the output electrode connection piece 14 and the base body 21 may be realized, but connection reliability between the output electrode connection piece 14 and the base body 21 may be improved. Besides, the coordination of the two connectors 22 may prevent the output electrode connection piece 14 from rotating relative to the base body 21, thereby improving accuracy of location. The number of the connectors 22 may be determined in accordance with shapes and sizes of the base body 21 and the output electrode connection piece 14, and requirements of operation conditions and heat quantity of the battery module 1. For example, the output electrode base 2 may be provided with three connectors 22 forming a triangle structure, thereby further improving connection reliability between the output electrode connection piece 14 and the base body 21, and further reducing the amount of generated heat.

Further, as shown in FIG. 3, the connector 22 further includes a metal plate 223 above the surface of the base body 21. Upon connection, the output electrode connection piece 14 may abut against the metal plate 223.

When the battery module 1 operates for a long time, the cell generates heat and transmits the heat through the output electrode connection piece 14, and a plastic material is prone to creeping after being heated. In this embodiment, since the output electrode connection piece 14 abuts against the metal plate 223 and is fastened by the connecting post 221 after connection, there is no plastic material structure (a part of the base body 21) between the output electrode connection piece 14 and the metal plate 223. In this way, the output electrode connection piece 14 and the metal plate 223 are directly connected, so as to prevent a locking force between the output electrode connection piece 14 and the base body 21 from being reduced caused by creeping of the plastic structure, so that connection between the output electrode connection piece 14 and the base body 21 is well reliable.

Specifically, with reference to FIG. 3 and FIG. 4, the securing member 222 includes a first securing member 222a and a second securing member 222b. The first securing member 222a and the second securing member 222b are distributed axially relative to the connecting post 221, and the radial size of the second securing member 222b is greater than the radial size of the first securing member 222a.

As described above, both the first securing member 222a and the second securing member 222b are injected in the base body 21, and the second securing member 222b of a greater radial size may increase not only the axial contact area between the securing member 222 and the base body 21, but also the radial contact area between the securing member 222 and the base body 21, thereby increasing reliability of connection therebetween and preventing the securing member 222 from escaping from the base body 21.

Figure 6:
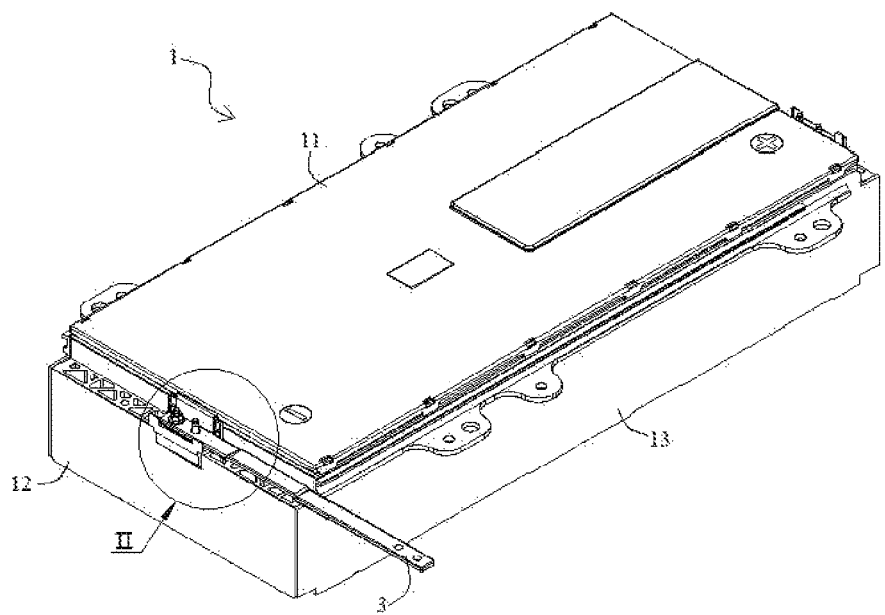
FIG. 6 is a schematic structural view of a battery module in a battery pack.

Further, the base body 21 includes an installation board 211 and an installation base 212 distributed axially relative to securing member 222 (e.g., a threaded rod). The installation board 211 and the installation base 212 are integrally injection-molded, and the installation base 212 is relative thicker. The installation board 211 is located above the installation base 212, and has an installation plane to secure the output electrode connection piece 14. Besides, as shown in FIG. 6, the above-described securing member 222 further includes a third securing member 222c which is disposed axially with the first securing member 222a and the second securing member 222b relative to the connecting post 221. Therefore, the first securing member 222a, the second securing member 222b and the third securing member 222c are injected into the base body 21, that is, they are disposed in the base body 21.

In this embodiment, since the first securing member 222a, the second securing member 222b and the third securing member 222c are injected in the base body 21, a depth of the connector 22 in the base body 21 may be increased, thereby preventing the securing member 222 from escaping from the base body 21.

Besides, the metal plate 223 shall above the installation board 211 of the base body 21. Therefore, the metal plate 223 is secured to the third securing member 222.

Specifically, as shown in FIGS. 4-6, the connector 22 may include a bolt whose head and at least part of the threaded rod are injected in the base body 21, and the bolt is a flange bolt including a flange. Therefore, the head of the flange bolt is the above-described first securing member 222a, and the flange is the above-described second securing member 222b. Besides, the connector 22 further includes a washer-nut which is screwed to the threaded rod of the bolt. Therefore, the washer-nut is the above-described third securing member 222c, and a first washer of the washer-nut is above the base body 21 to form the above-described metal plate 223. The lower surface of the first washer abuts against the installation board 211 of the base body 21, and the upper surface of the first washer is configured to abut against the lower surface of the output electrode connection piece 14. Herein, the washer-nut refers to a nut with a washer.

When the washer-nut is screwed to the flange bolt, the washer-nut abuts against the flange (second securing member 222b) of the flange bolt at an end surface of the washer-nut being away from the first washer (the metal plate 223). Therefore, the flange bolt and the washer-nut are screwed to form the above-described securing member 222.

It shall be noted that the connector 22 in the present disclosure does not have to include a bolt, but other structures commonly used in this art may be applied. For example, the connecting post 221 may be a cylindrical smooth rod structure. Correspondingly, the first installing hole of the output electrode connection piece 14 is a round hole and the external diameter of the cylindrical smooth rod matches the diameter of the round hole. In this embodiment, when the output electrode connection piece 14 and the base body 21 are screwed together, connection reliability therebetween may be further improved, and axial relative movement of the output electrode connection piece 14 and the base body 21 relative to the connecting post 221 may be prevented.

Besides, when the flange bolt is used, there is also axially a certain contact area between the flange and the base body 21 relative to the connecting post 221. That is, the flange bolt and the base body 21 are in contact with each other both axially and radially. Therefore, the connection reliability between the flange bolt and the base body 21 may be improved, and the flange bolt may be prevented from escaping from the base body 21 when being pulled.

Besides, the above-described third securing member 222c is not necessarily realized by the washer-nut, but may be by a conventional hexagonal nut, with a metal plate 223 being disposed on the bolt. In this embodiment, the first washer of the washer-nut itself may be used as a metal plate 223, so that it is unnecessary to additionally dispose a metal plate 223 on the bolt, which is advantageous in a simple structure and reduced processing cost. In addition, compared with a conventional hexagonal nut, the washer-nut may further increase the contact area between the third fixing member 222c and the base body 21, thereby improving the connection reliability therebetween and anti-tensile capability of the output electrode base 2.

As shown in FIG. 4, when the output electrode base 2 is to be produced, two flange bolts are prepared first, then the two washer-nuts are screwed to corresponding threaded rods, making the respective end faces thereof abut against the flanges of the flange bolts. Finally, each securing member 222 formed by the flange bolt and the spacer nut is integrally molded with the base body 21, and it is ensured that the first washer 231 of the washer-nut above the surface of the base body 21.

On the basis of this, embodiments of the present application further provide a battery module 1. As shown in FIG. 1, the battery module 1 includes a housing and a cell located in the housing. The housing includes a top cover 11, an end plate 12 and a side plate. The end plate 12 is located at the output electrode end of the battery module 1 and is configured to resist a swelling force of the cell. Besides, as shown in FIG. 2, the battery module 1 further includes the output electrode base 2 configured to provide insulation protection for the output electrode connection piece 14 of the battery module 1.

Herein, the output electrode base 2 is any of the above-described output electrode base 2. Since the output electrode base 2 has the above-described technical effect, the battery module 1 including the output electrode base 2 shall also have a corresponding technical effect, which is not herein repeated.

Figure 7:
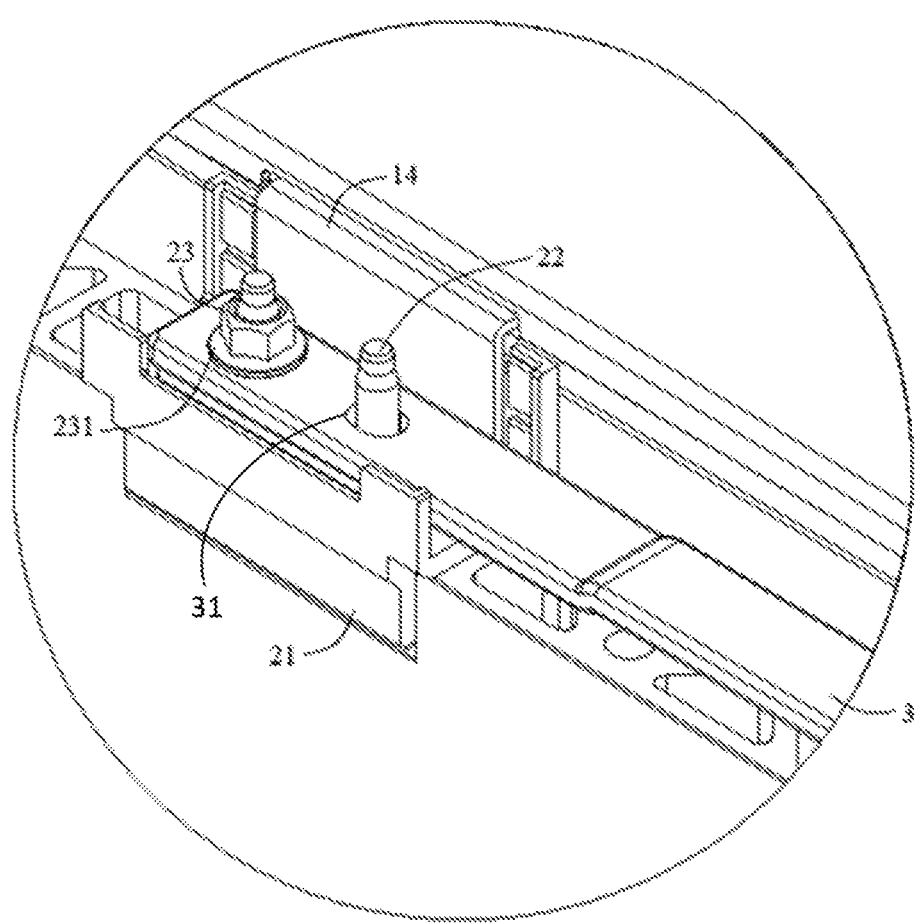
FIG. 7 is a partial zoomed-in view of Part II in FIG. 6.
Figure 8:
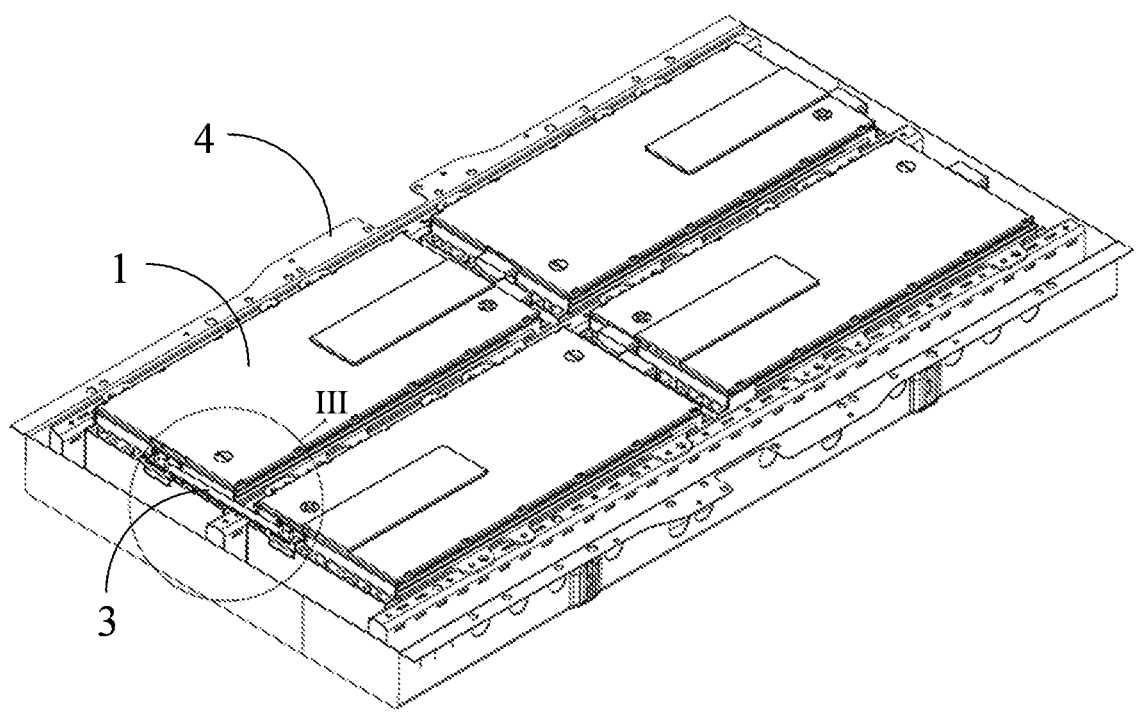
FIG. 8 is a schematic structural view of a battery pack.
Figure 9:
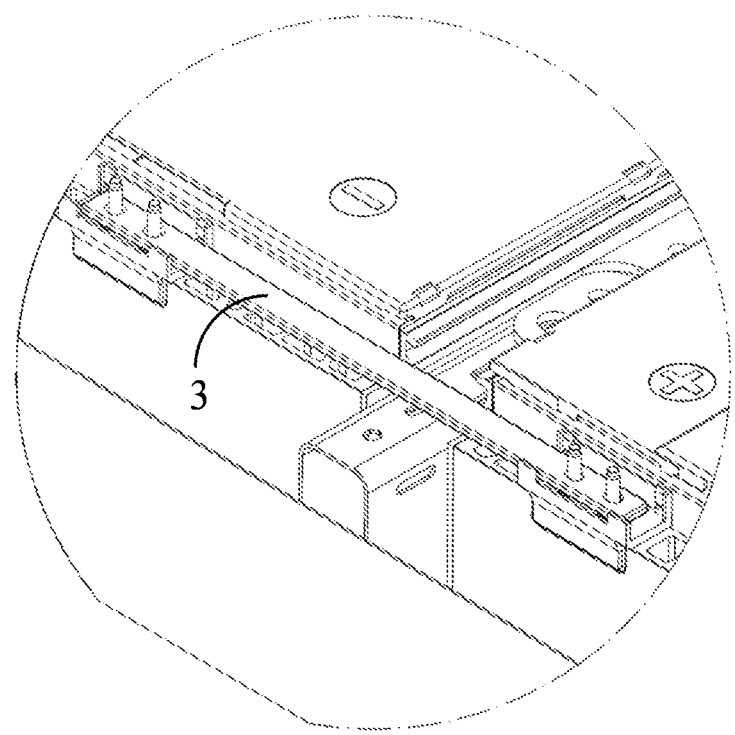
FIG. 9 is a partial zoomed-in view of Part III in FIG. 8.

With further reference to FIGS. 6 and 7, FIG. 6 is a schematic structural view of a battery module in a battery pack; and FIG. 7 is a partial zoomed-in view of Part II in FIG. 6.

Further, embodiments of the present disclosure further provide a battery pack including a casing and a plurality of battery modules 1 located in the casing. Herein, the battery module 1 is any of the above-described battery module 1.

Further, with reference to FIG. 6 and FIG. 7, in the battery pack, adjacent battery modules 1 are connected with each other through a module connection piece 3 which is connected with an output electrode of an adjacent battery module 1. Specifically, the module connection piece 3 is provided with a second installing hole, and the connecting post 221 of the output electrode base 2 is correspondingly installed in the second installing hole, thereby realizing electrical connection of the plurality of battery modules 1.

In this embodiment, as shown in FIG. 7, based on the structure of the output electrode base 2, the module connection piece 3 is provided with four second installing holes, the four second installing holes are divided into two groups with each includes two installing holes and is disposed at an end of the module connection piece 3. When the structure (number and disposing manner of the connecting post) of the output electrode base 2 changes, the number and positional relationship of the second installing holes of the module connection piece 3 correspondingly change.

Further, as shown in FIG. 7, the above-described connector 22 includes the connecting post 221 and the securing member 222, and specifically includes the flange bot and the washer-nut. Herein, a portion of threaded rod of the flange bolts forms the above-described connecting post 222. The head of the flange bolt, the flange of the flange bolt and the washer-nut form the above-described securing member 222, and the first washer of the washer-nut forms the above-described metal plate 223.

Besides, the connecting post 221 is further screwed to a nut 23 through which the module connection piece 3 is fixedly locked.

In this embodiment, when the plurality of battery modules 1 are connected to form a battery pack, the module connection piece 3 and output electrode bases 2 are connected through the plurality of connecting posts 221 which may realize positioning of the connection piece 3. When the nut 23 is connected, an operator may lock the nut 23 tight with one hand, thus realizing fixing of the module connection piece 3, which may avoid a risk of short circuit and ensure safety of the operator, as compared with an operator realizing positioning of the module connection piece 3 by two hands in the existing technology.

Specifically, as shown in FIG. 7, the nut 23 is a washer-nut having a second washer 231. When the nut 23 is screwed to the bolt, the second washer 231 may abut against the module connection piece 3.

When the nut 23 is a washer-nut, the second washer 231 may also abut against the module connection piece 3, as compared with a conventional hexagonal nut, so that the contact area between the nut 23 and the module connection piece 3 may be increased. That is, the area for current flow between the nut 23 and the module connection piece 3 is large, resulting in better current flow, so that heat generated during operation of the battery pack is reduced. In addition, compared with a conventional hexagonal nut, the washer-nut may further increase the contact area between the nut 23 and the module connection piece 3, thereby improving the connection reliability and anti-tensile capability.

The above-described are only preferable embodiments of the present application but are not used to impose a limitation to the present disclosure. Any modification, equivalent substitution and improvement within the spirit and principle of the present disclosure shall be included in the scope of protection of the present disclosure.

The invention claimed is:

1. An output electrode base of a battery module, wherein the output electrode base comprises a base body and a connector;
wherein the connector comprises a securing member and a connecting post, the securing member is secured in the base body, and the connecting post protrudes from the base body; and
wherein the connecting post is configured to penetrate through a first installing hole of an output electrode connection piece of the battery module and connect with the output electrode connection piece of the battery module to realize connection between the output electrode connection piece and the base body.

2. The output electrode base in accordance with claim 1, wherein the connector further comprises a metal plate above the base body, and the metal plate is configured to abut against the output electrode connection piece; the connecting post of the connector is a metal structure.

3. The output electrode base in accordance with claim 1, wherein the securing member comprises a first securing member and a second securing member;
the first securing member and the second securing member are disposed axially relative to the connecting post, wherein the second securing member is configured to contact with the base body radially and axially, and a radial size of the second securing member is greater than a radial size of the first securing member.

4. The output electrode base in accordance with claim 3, wherein the securing member further comprises a third securing member, and the third securing member is disposed axially with the first securing member and second securing member relative to the connecting post; the third securing member is configured to penetrate through the base body to fixedly connect the metal plate.

5. The output electrode base in accordance with claim 1, wherein the output electrode base is provided with at least two connectors.

6. The output electrode base in accordance with claim 1, wherein one end of the connecting post extends into the base body; and
a portion of the connecting post located in the base body is connected with the securing member.

7. The output electrode base in accordance with claim 1, wherein the connector comprises a flange bolt and a washer-nut, and the washer-nut is screwed to a threaded rod of the flange bolt; and
a head of the flange bolt, a flange of the flange bolt and the washer-nut form the securing member, and a portion of the threaded rod of the flange bolt forms the connecting post.

8. A battery module, comprising:
an end plate, being located at an output end of the battery module;
an output electrode connection piece, being provided with a first installing hole;
an output electrode base, being secured to the end plate; wherein the output electrode base comprises a base body and a connector;
wherein the connector comprises a securing member and a connecting post, the securing member is secured in the base body, and the connecting post protrudes from the base body; and
wherein the connecting post is configured to penetrate through a first installing hole of an output electrode connection piece of the battery module and connect with the output electrode connection piece of the battery module to realize connection between the output electrode connection piece and the base body.

9. The battery module in accordance with claim 8, wherein the connector further comprises a metal plate above the base body, and the metal plate is configured to abut against the output electrode connection piece; the connecting post of the connector is a metal structure.

10. The battery module in accordance with claim 8, wherein the securing member comprises a first securing member and a second securing member;
the first securing member and the second securing member are disposed axially relative to the connecting post, wherein the second securing member is configured to contact with the base body radially and axially, and a radial size of the second securing member is greater than a radial size of the first securing member.

11. The battery module in accordance with claim 8, wherein the output electrode base is provided with at least two connectors.

12. The battery module in accordance with claim 8, wherein one end of the connecting post extends into the base body; and
a portion of the connecting post located in the base body is connected with the securing member.

13. The battery module in accordance with claim 8, wherein the connector comprises a flange bolt and a washer-nut, and the washer-nut is screwed to a threaded rod of the flange bolt; and
a head of the flange bolt, a flange of the flange bolt and the washer-nut form the securing member, and a portion of the threaded rod of the flange bolt forms the connecting post.

14. A battery pack, comprising a casing and a plurality of battery modules; wherein
each battery module comprises
an end plate, being located at an output end of the battery module;
an output electrode connection piece, being provided with a first installing hole;
an output electrode base, being secured to the end plate; wherein the output electrode base comprises a base body and a connector;
wherein the connector comprises a securing member and a connecting post, the securing member is secured in the base body, and the connecting post protrudes from the base body; and
wherein the connecting post is configured to penetrate through a first installing hole of an output electrode connection piece of the battery module and connect with the output electrode connection piece of the battery module to realize connection between the output electrode connection piece and the base body;
the battery modules are connected through a module connection piece; and
the module connection piece is provided with a second installing hole, and the connecting post is configured to connect the module connection piece with the output electrode connection piece through the second installing hole.

15. The battery pack in accordance with claim 14, wherein the connecting post comprises a threaded rod, and the connecting post is configured to screw with a nut;
the nut is configured to abut against the module connection piece.

16. The battery pack in accordance with claim 14, wherein the connector further comprises a metal plate above the base body, and the metal plate is configured to abut against the output electrode connection piece; the connecting post of the connector is a metal structure.

17. The battery pack in accordance with claim 14, wherein the securing member comprises a first securing member and a second securing member;

the first securing member and the second securing member are disposed axially relative to the connecting post, wherein the second securing member is configured to contact with the base body radially and axially, and a radial size of the second securing member is greater than a radial size of the first securing member.

18. The battery pack in accordance with claim 14, wherein the output electrode base is provided with at least two connectors.

19. The battery pack in accordance with claim 14, wherein one end of the connecting post extends into the base body; and a portion of the connecting post located in the base body is connected with the securing member.

20. The battery pack in accordance with claim 14, wherein the connector comprises a flange bolt and a washer-nut, and the washer-nut is screwed to a threaded rod of the flange bolt; and a head of the flange bolt, a flange of the flange bolt and the washer-nut form the securing member, and a portion of the threaded rod of the flange bolt forms the connecting post.

* * * * *